(12) United States Patent
Stoila (10) Patent No.: US 7,780,807 B2
(45) Date of Patent: Aug. 24, 2010

(54) AIR SHAPING OF GREEN TIRE CARCASS

(75) Inventor: George Michael Stoila, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 936 days.

(21) Appl. No.: 11/592,907

(22) Filed: Nov. 3, 2006

(65) Prior Publication Data

US 2008/0105360 A1  May 8, 2008

(51) Int. Cl.
*B29D 30/36* (2006.01)
(52) U.S. Cl. .............. 156/130.7; 156/416; 264/326; 425/31; 425/52
(58) Field of Classification Search .......... 156/415, 156/416, 123, 130.5, 130.7; 425/23, 24, 425/43–45, 51–53, 33, 36, 31; 264/326
See application file for complete search history.

(56) References Cited

U.S. PATENT DOCUMENTS

| 2,808,618 | A | * | 10/1957 | Soderquist | ............... 425/33 |
|---|---|---|---|---|---|
| 2,880,458 | A | * | 4/1959 | Fröhlich et al. | ........... 264/315 |
| 3,278,990 | A | * | 10/1966 | Samuel et al. | ............ 425/43 |
| 4,226,656 | A | * | 10/1980 | Appleby et al. | ........... 156/132 |
| 4,444,715 | A |   | 4/1984 | Nixon et al. | ........... 264/501 |
| 4,606,714 | A |   | 8/1986 | Nixon et al. | ........... 425/28 R |
| 4,812,197 | A | * | 3/1989 | Wright | ............... 156/415 |

* cited by examiner

*Primary Examiner*—Geoffrey L Knable
(74) *Attorney, Agent, or Firm*—June E. Rickey (57) ABSTRACT

An apparatus for shaping a green tire carcass is provided having a bladder mounted to a first and second support, a retractable support shaft mounted inside the bladder, and upper and lower bead ring for mounting the beads of the tire carcass thereon, wherein one of said bead rings has a channel in fluid communication with a pressurized source of fluid, wherein said channel has an outlet located between said bladder and said carcass for injecting pressurized fluid between the carcass and the bladder.

2 Claims, 10 Drawing Sheets

AIR SHAPING OF GREEN TIRE CARCASS

FIELD OF THE INVENTION

This application relates to the bladder shaping of green tire carcasses prior to vulcanization, and more particularly to large tire shaping of carcasses.

BACKGROUND OF THE INVENTION

Tire uniformity is important for all tires, especially large off the road tires. One type of tire nonuniformity can occur in the tire carcass. For the green tire carcass, it is important that the carcass ply wire spacing be evenly distributed. It is further important that the liner gage be evenly distributed as well. Failure to meet specific uniformity criteria often results in the scrapping of tire carcasses, which can be expensive and wasteful. One cause of carcass nonuniformity may be attributable to the bladder shaping process. For very large radial tires, there tends to be a shape mismatch between the collapsed bladder and the green tire carcass. For example, prior to inflating the bladder, the collapsed outer diameter or circumference of the bladder used in the tire shaping process may exceed the inner diameter or circumference of the green tire. In addition, as the bladder is inflated, the bladder has an outer diameter much larger than the carcass inner diameter.

Figure 1:
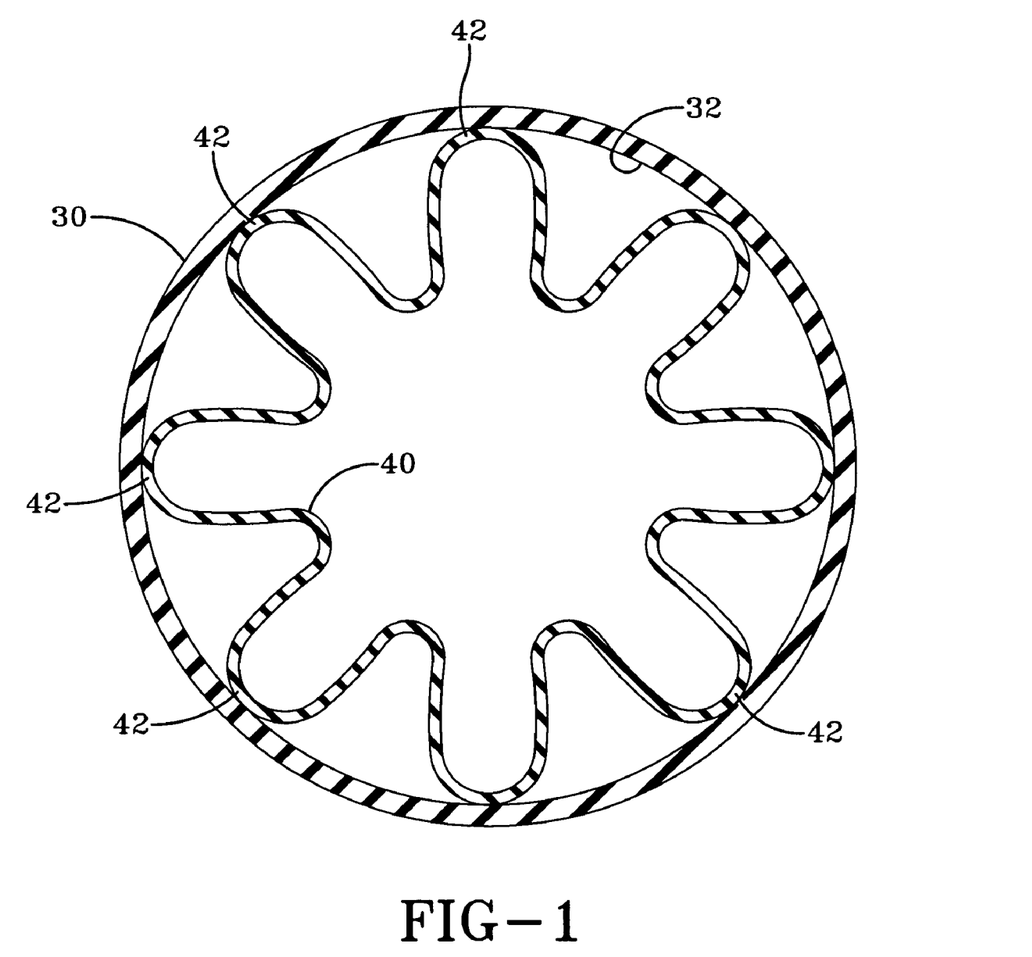
FIG. 1 illustrates a simplified schematic of a cross sectional view of the uninflated green carcass with a folded bladder inside.

FIG. 1 illustrates a simplified schematic of a green carcass 30 with a folded bladder 40 inside. Certain edges 42 of the folded bladder are in contact with the inner surface 32 of the green tire carcass. The bladder edges have a tendency to grip the tire carcass, so that as the bladder is inflated, it results in the over stretching of the casing between the contact points and a localized thinning of the liner gauge. Once the overstretching occurs, the tire carcass must be scrapped. Thus an improved method and apparatus for shaping a large green tire carcass is desired, without any of the afore-mentioned disadvantages.

SUMMARY OF THE INVENTION

The invention provides in a first aspect a method of shaping a green tire carcass comprising the steps of: positioning a green tire carcass about an internal bladder, mounting a first bead of the green tire onto a first ring, and a second bead onto an air shaping ring, injecting pressurized fluid through said air shaping ring, into the cavity formed between the carcass and the bladder to inflate the carcass, and then inflating the bladder to further shape the carcass. Preferably the fluid between the carcass and the bladder is removed prior to inflating the bladder.

The invention provides in a second aspect an apparatus for shaping a green tire carcass comprising: a bladder mounted to a first and second support, a retractable support shaft mounted inside the bladder, and upper and lower bead ring for mounting the beads of the tire carcass thereon, wherein one of said bead rings has a channel in fluid communication with a pressurized source of fluid, wherein said channel has an outlet located between said bladder and said carcass for injecting pressurized fluid between the carcass and the bladder.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies of which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

BRIEF DESCRIPTION OF THE DRAWINGS

The invention will be described by way of example and with reference to the accompanying drawings in which:

FIGS. 6-10 illustrate the various stages of the carcass shaping process;

FIG. 9 is a top view of the air shaping ring;

DETAILED DESCRIPTION OF THE INVENTION

Figure 2:
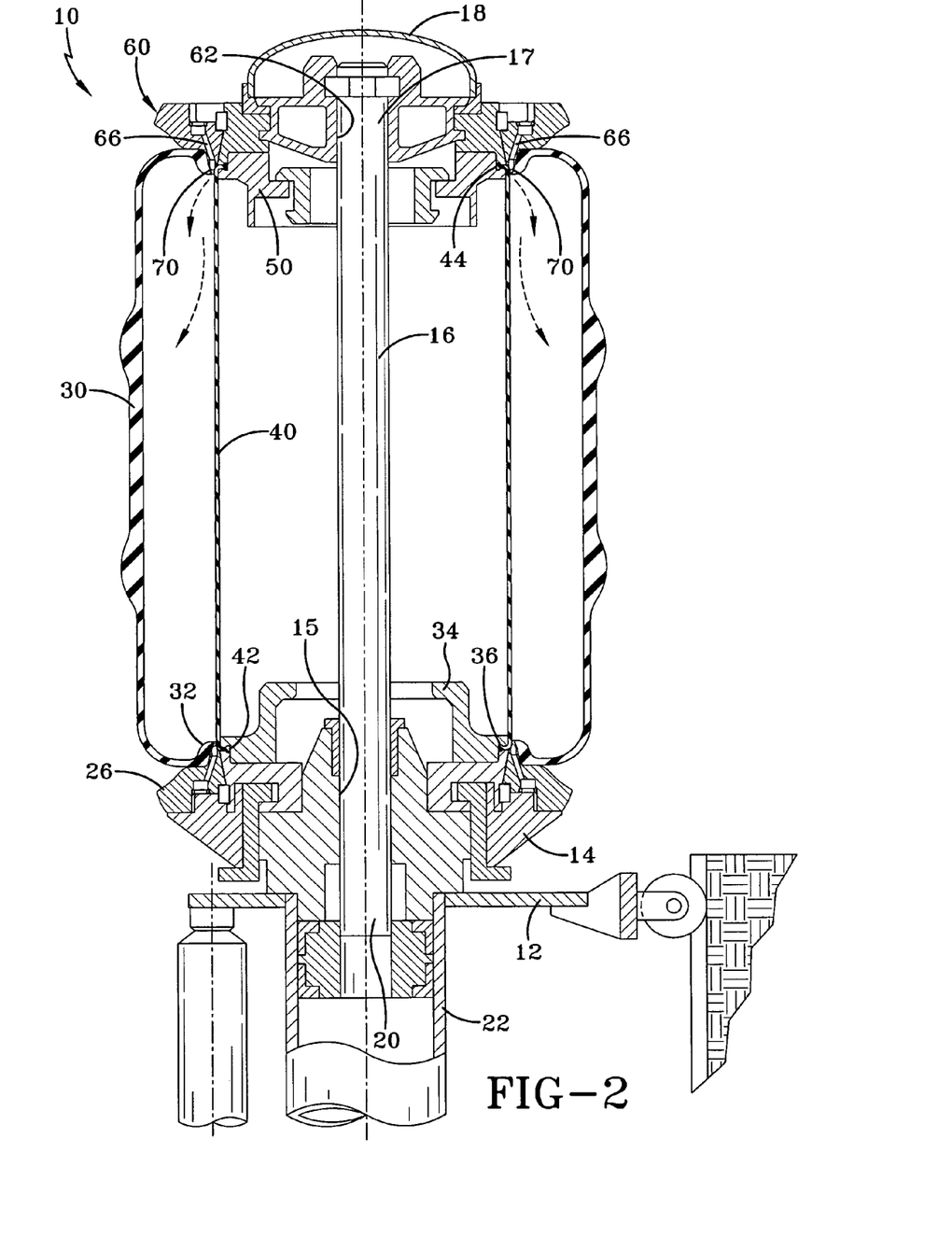
FIG. 2 is a simplified schematic of cross-sectional view of a deflated bladder shown inside a green tire carcass of a tire shaping device.

FIG. 2 illustrates a cross-sectional view of a green tire shaping mechanism, shown generally at 10. The tire shaping mechanism 10 is mounted upon a support frame 12. Connected to the support frame 12 is a lower end of a bottom annular mold ring 14. The mold ring 14 is removably mounted to the support frame 12. The mold ring 14 has an interior hole 15 for receiving an inner support shaft 16. The support shaft 16 has a first end 17 received in the upper part of the tire shaping mechanism 18. The support shaft has a second end 20 received in a cylindrically shaped chamber 22 of the support frame 12, to allow the support shaft to retract into the chamber 22 during tire shaping.

Figure 3:
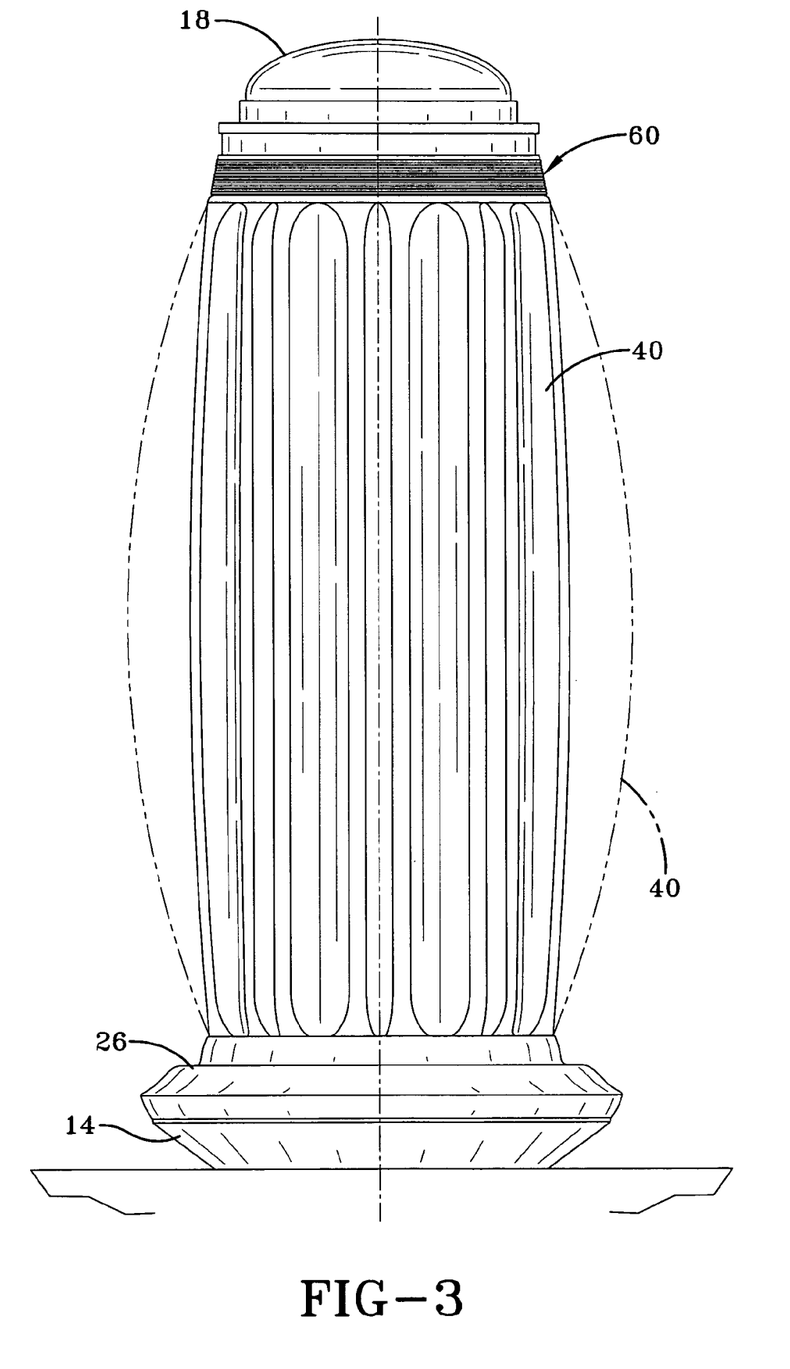
FIG. 3 is a perspective view of a large tire shaping bladder shown under internal vacuum in solid lines, and in the relaxed state in phantom.
Figure 4:
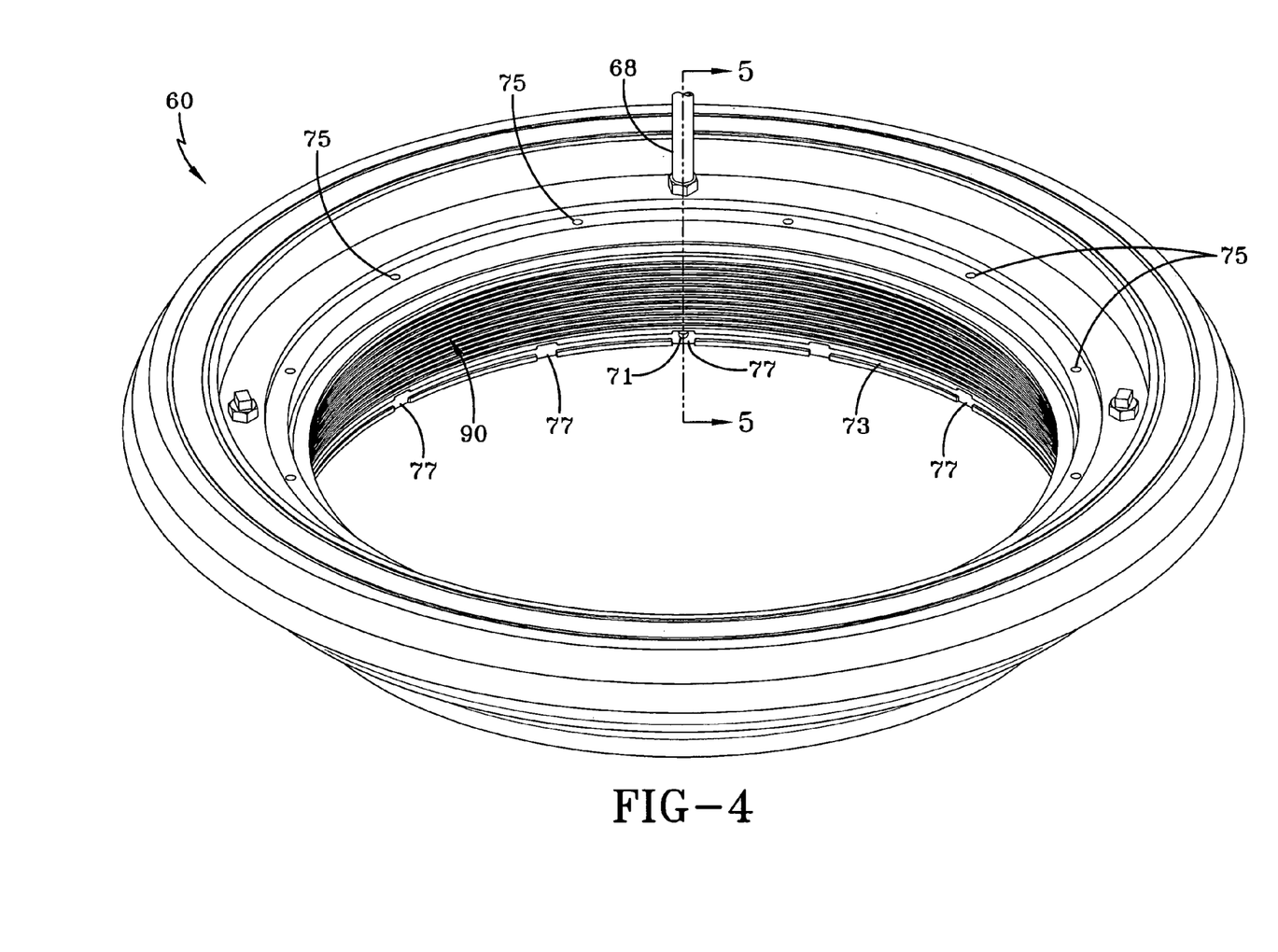
FIG. 4 is a perspective view of an air shaping ring.

The bottom mold ring 14 is connected to a lower annular bead ring 26 for receiving and securing a first bead ring 32 of a green tire carcass 30. A bladder retention ring 34 is secured to the lower annular bead ring 26. The bladder retention ring 34 has an annular groove 36 for securing the bottom end 42 of a bladder 40 to the retention ring. The bladder 40, as shown in this embodiment, is a very large, cylindrically shaped bladder in the at rest position, typically with multiple folds as shown in FIG. 3. The bladder folds may be numerous, with the bladder outside circumference greater than the tire inside circumference (position shown in phantom). The bladder has a second end 44 which is received in a groove of an upper bladder retention ring 50. Connected to the upper bladder retention ring is an annular fluid shaping mold ring 60. The shaping ring 60 has an inner bore 62 for receiving the shaft 16. A pressure retaining cap 18 is received onto shaft end 17.

Figure 5:
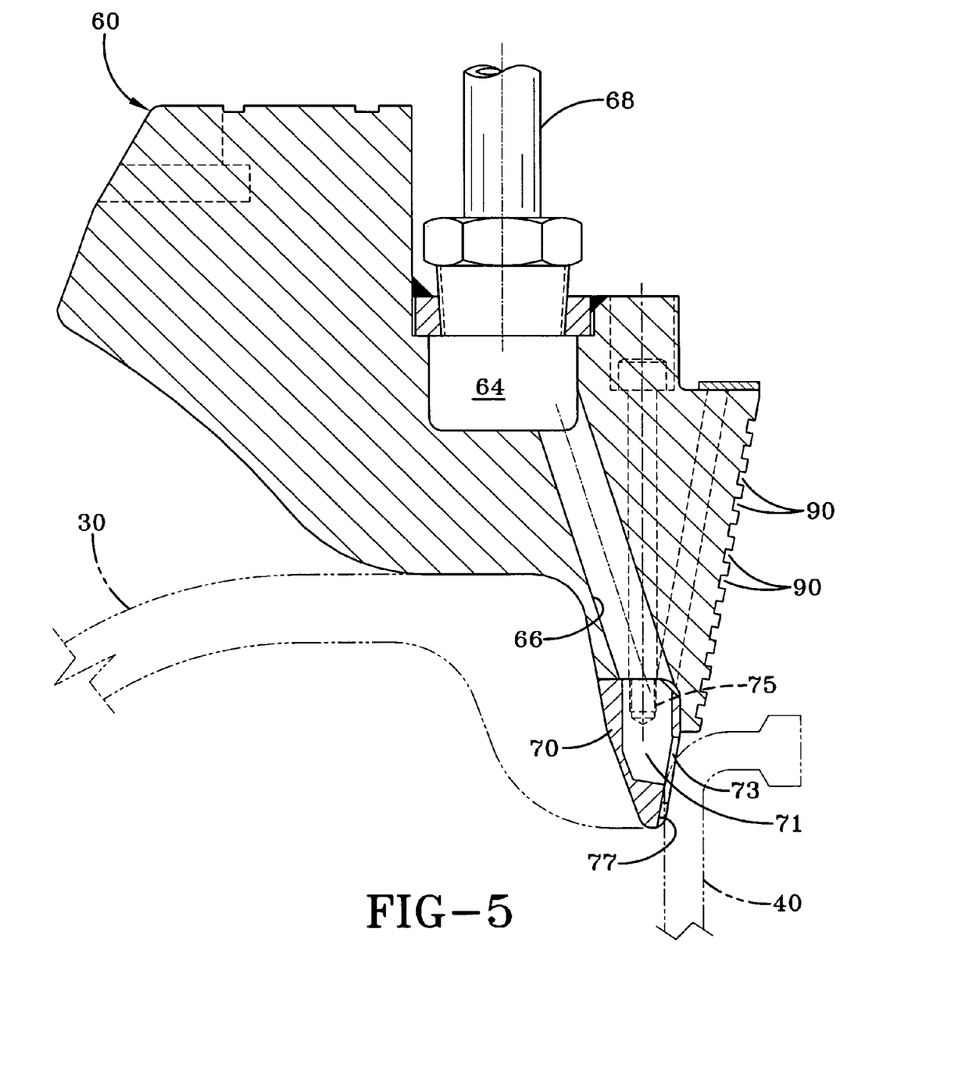
FIG. 5 is a cross-sectional view of the air shaping ring in the direction 5-5 of FIG. 4.

As shown in FIG. 5, the fluid shaping ring 60 has an internal annular manifold 64 for channeling pressurized supply fluid, typically air, from a pressurized fluid supply 68 to the inner portion of the shaping ring 60. Supply fluid is channeled through the shaping ring manifold 64 to one or more interior channels 66, typically 5 or more, which extend from the manifold on the upper surface of the ring to the lower radial surface or toe end 70 of the ring 60. Pressurized fluid is directed from manifold through the channel 66 and out the orifices 71 located on the lower toe end 70 of the ring 60 and then through annular channel 73. The pressurized fluid is then directed from the annular channel into the space between the bladder 40 (shown in phantom in FIG. 5) and the tire carcass 30 (shown in phantom) to help shape the tire carcass, as described in more detail, below.

The fluid shaping ring 60 may additionally comprise optional vent holes 75 spaced along the outer circumference of the shaping ring 60 located on lower radial toe end surface 70. The fluid shaping ring may further comprise one or more optional jumper channels 77 typically about 0.5-1.0 inch wide, located on the lower toe end 70. The jumper channels 77 interconnect annular channel 73 located on the inner surface of the toe end of the shaping ring. The optional jumper channel and vents function to provide additional pathways for the pressurized fluid to follow should one of the orifices 71 be blocked by the bladder during filling.

The fluid shaping ring may further comprise optional labyrinth grooves 90 located on the radially inner surface of the fluid shaping ring 60 which mates with the upper bladder retention ring 50. The labyrinth grooves provide a controlled venting of the pressurized medium during bladder shaping without the need for valves or other mechanical means.

The steps for shaping the carcass can now be described. First the green tire carcass to be shaped is mounted upon the tire shaping device 10. Then, an internal vacuum is drawn on the bladder to reduce the bladder outer diameter, as shown in FIG. 3 (in solid lines). Next, the green tire carcass is positioned over the bladder so that a first end of the bead is mounted on the lower bead ring 26. The air shaping ring 60 is positioned over the tire shaping device so that the outer circumferential edge of the shaping ring is in contact with the tire bead. The pressure retaining cap is next installed over the support shaft. The tire carcass is now ready for shaping.

Figure 6:
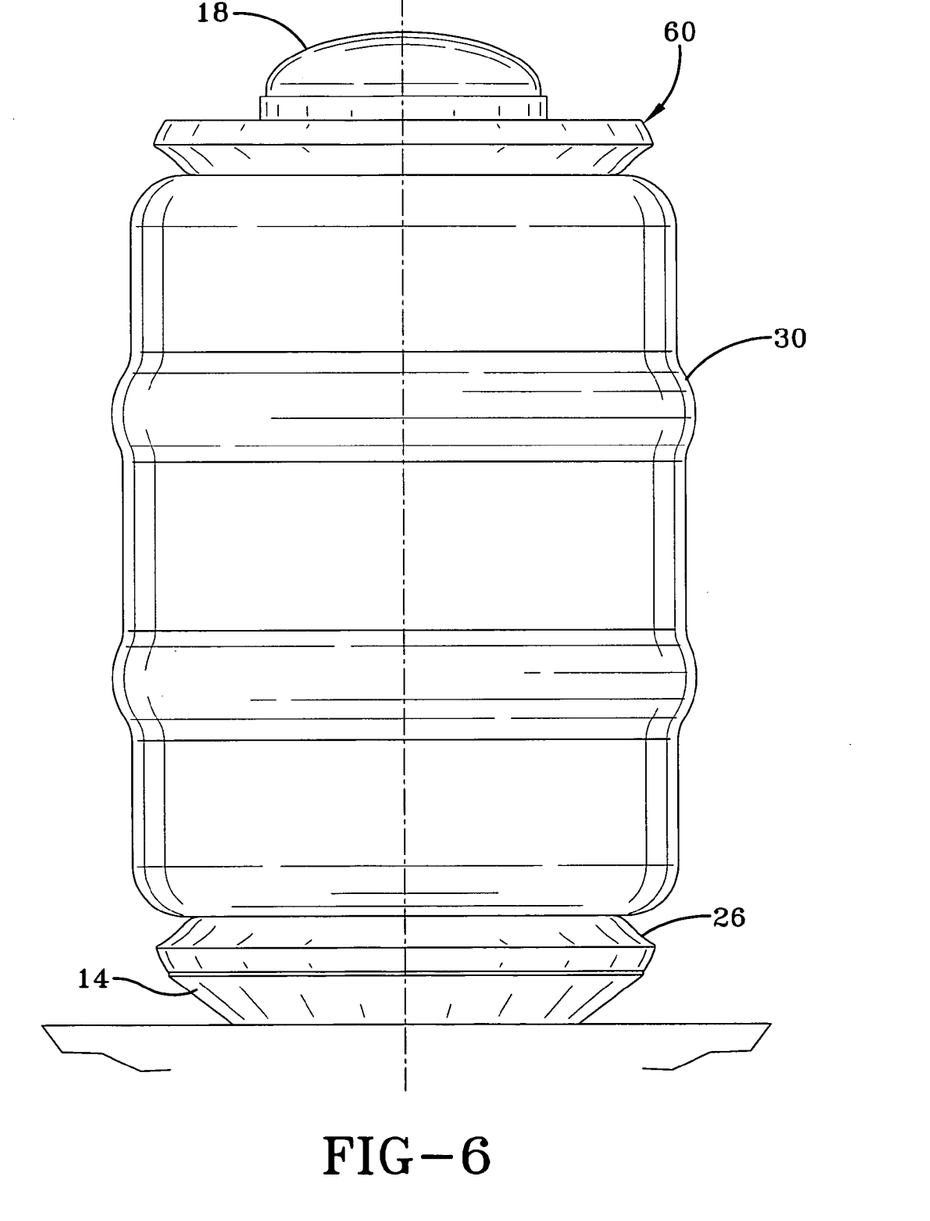

As shown in FIGS. 2 and 6, the shaping bladder is inflated and pressurized to an internal pressure of about 0.5 to 1 psig. Just holding the tire carcass in place, the bladder is still with many longitudinal folds, as the circumference of the curing bladder at rest has a larger diameter than the inside of the green tire carcass. Shaping fluid as indicated by the flow arrows in FIG. 2, is introduced between the bladder and the tire carcass. Pressurized fluid, typically air at about 4 to about 5 psig at about 100-300 scfm, typically about 200 scfm, is fed to inflate the tire casing in the range of about 4 to about 5 psig. See FIG. 7. During this step, the bladder initially collapses due to the higher external pressure (Pressure*volume=constant), and then the pressure balances resulting in the bladder expanding slightly.

Figure 7:
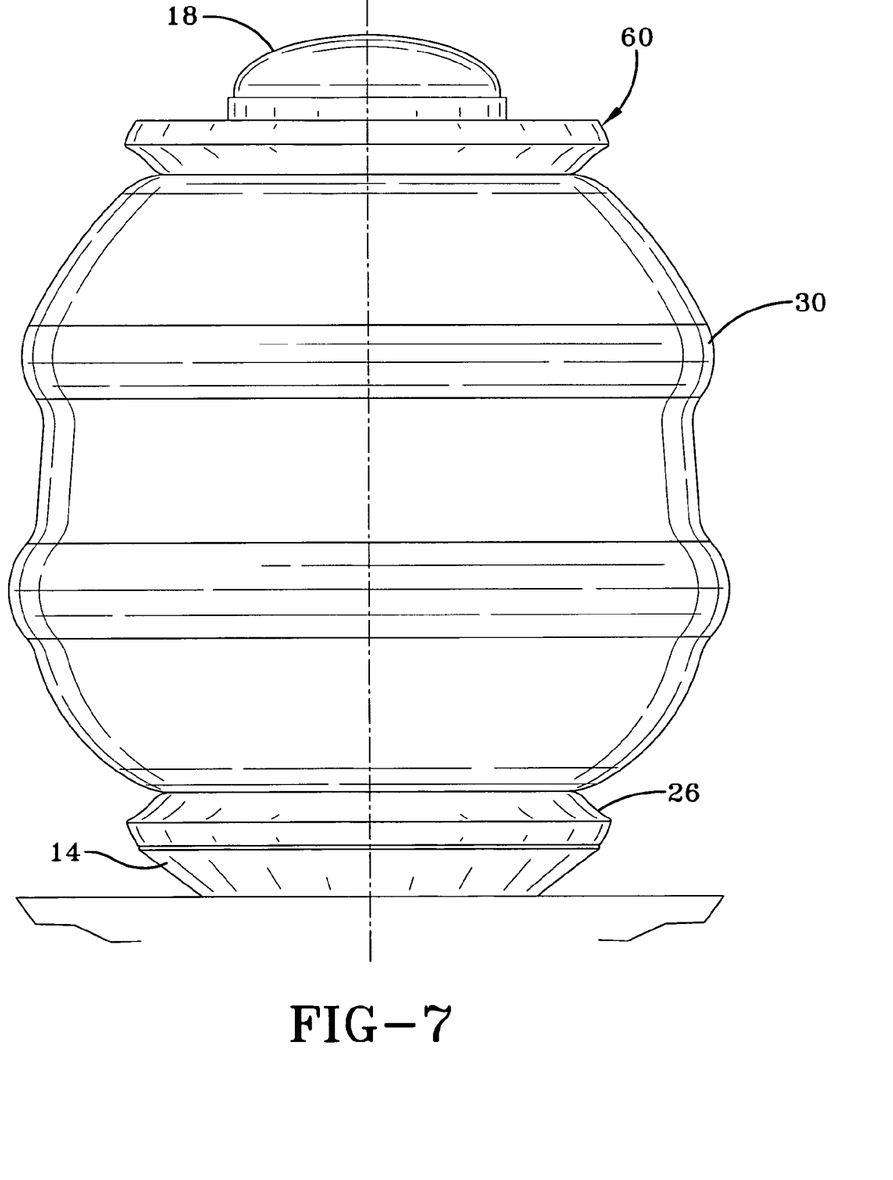

As shown in FIG. 7, the tire shaping device draws the green casing down in height when the support shaft 16 is retracted within the chamber 22. The bladder and supply fluid pressure is maintained constant, at about 4-5 psig. As the casing is drawn down in height, the carcass inner circumference increases to a value greater than the interference diameter of the bladder. The casing is now free from the bladder so when the bladder is inflated, the tire carcass will not adhere or pull on the inner liner and body ply causing cord spacing anomalies and thin liner gauge.

Next the shaping fluid may be turned off. The shaping fluid vents out the labyrinth grooves 90, which act like air brakes to slowly vent the supply fluid from the chamber. As the pressure medium is pumped out, the bladder slowly increases in volume.

Figure 8:
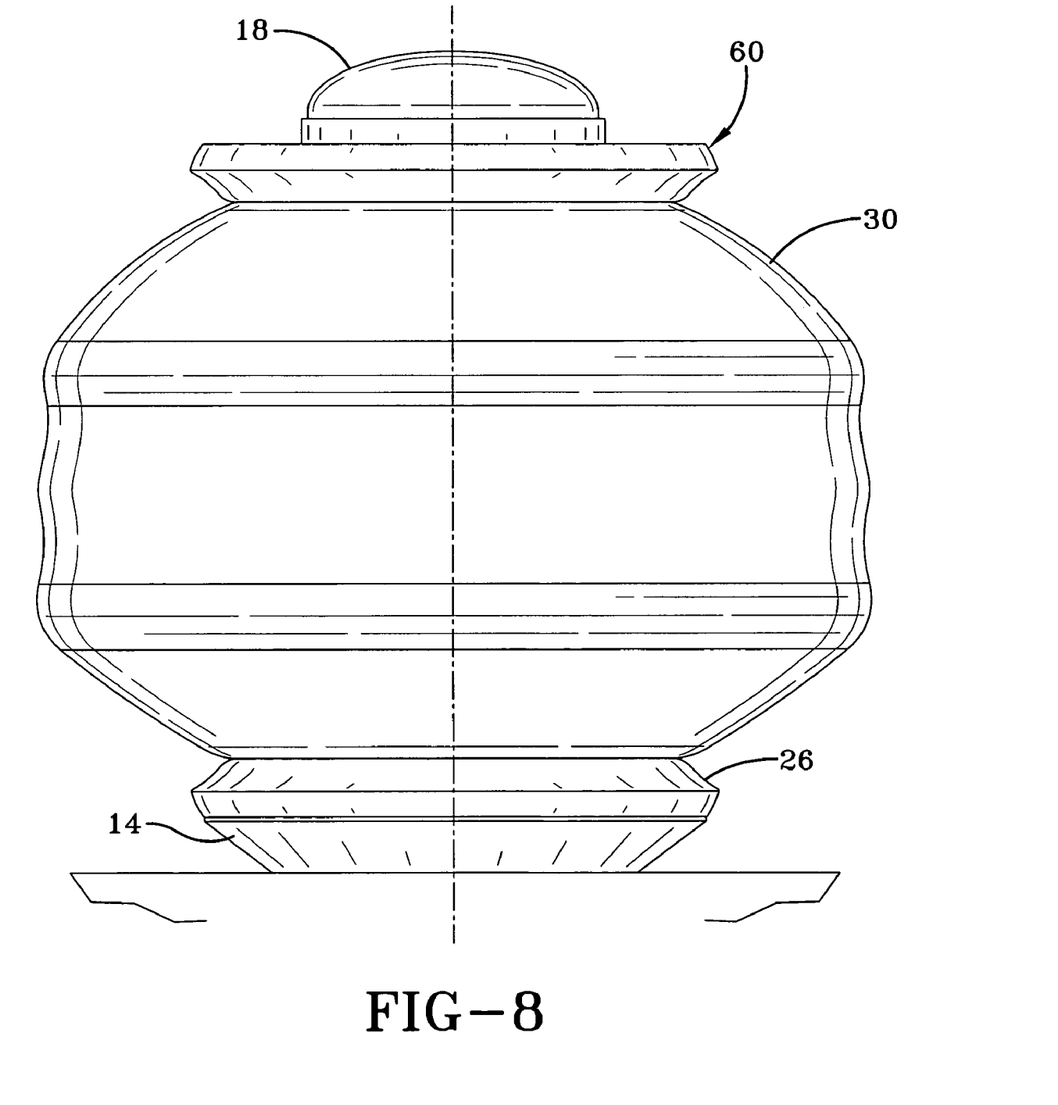
Figure 9:
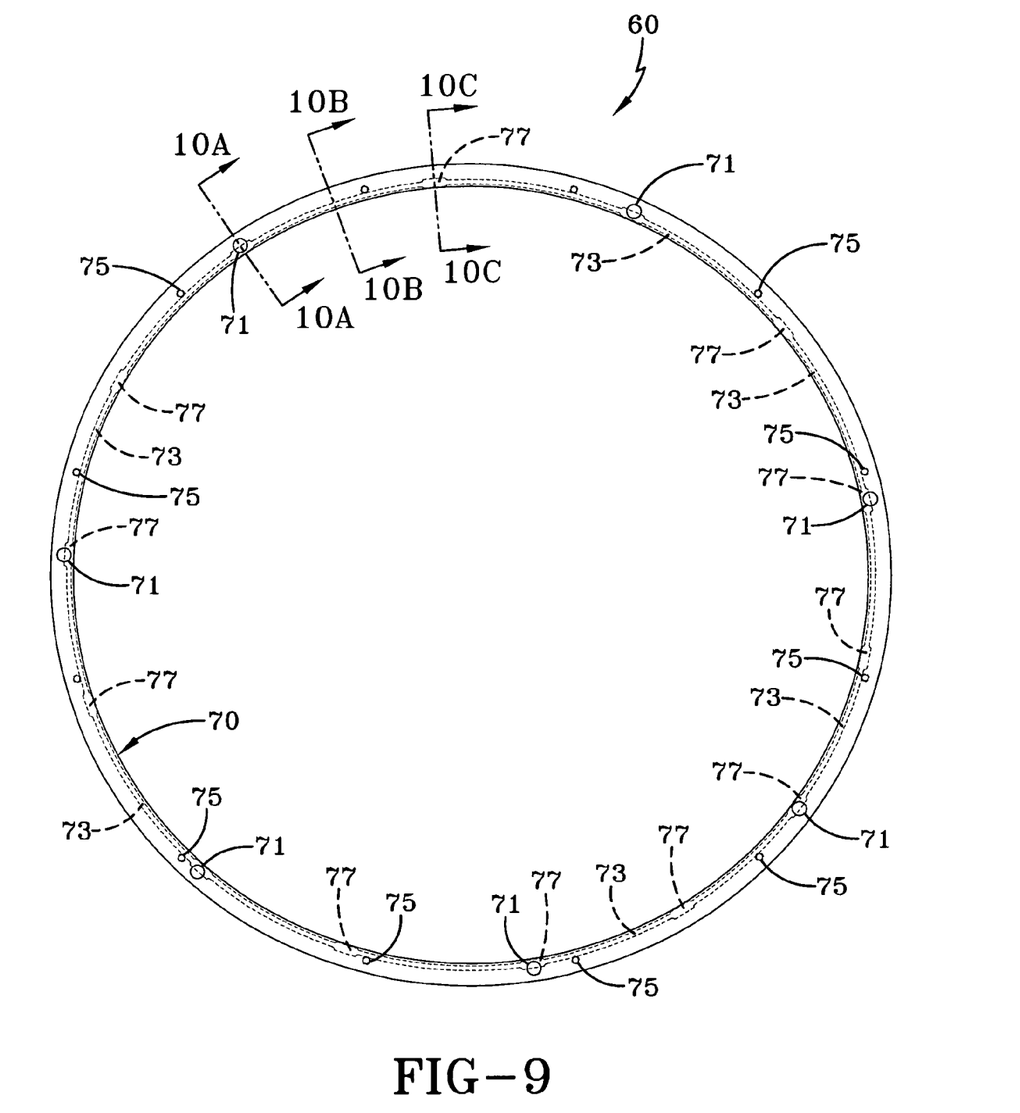
Figures 10A, 11A:
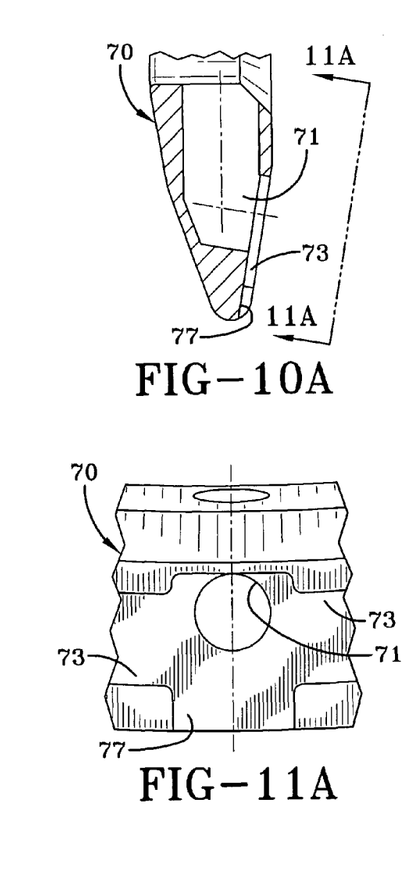
FIGS. 10A, 10B, 10C are cross sectional views taken in the directions indicated on FIG. 9.
FIGS. 11A, 11B, 11C are cross sectional views taken in the directions indicated on FIGS. 10A, 10B and 10C, respectively.
Figure 10B:
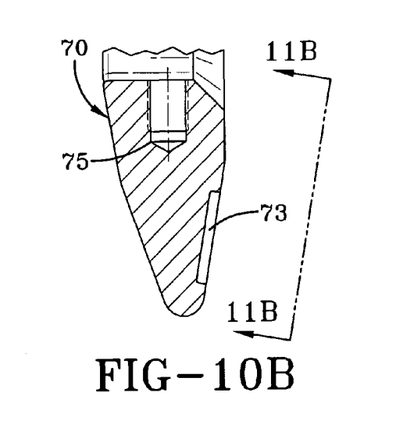
Figures 10C, 11C:
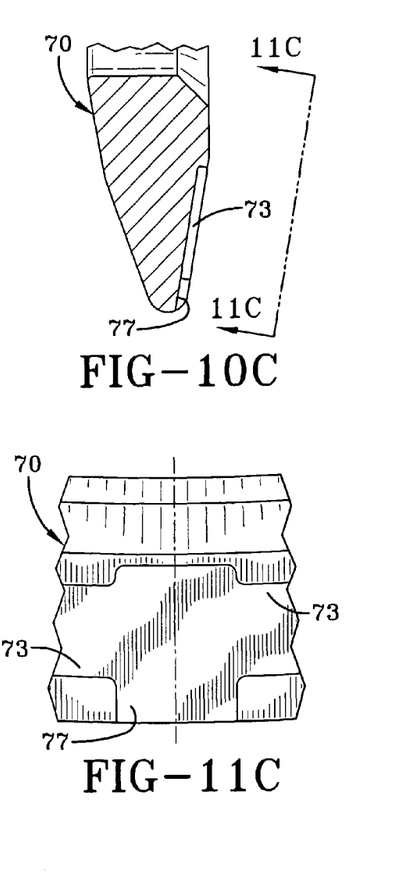
Figure 11B:
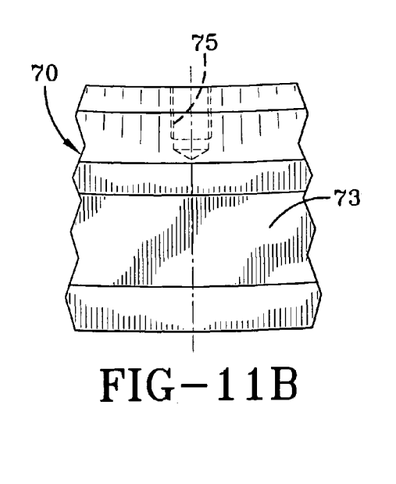

The bladder is then inflated to suitable pressure, typically about 6 psig. The bladder inflates and assumes the shape it would have at 1.5-2 psig. The shaping air has been completely evacuated, and the curing bladder expands due to the pressure differential. The casing is then further shaped by the bladder as shown in FIG. 8.

The benefit to this process is that the tire cords and liner gauge are more uniform. Further, there is an increase in bladder life as there is less wear and tear on the bladder due to the bladder sticking and slipping issues described above.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of shaping a green tire carcass comprising the steps of:
   providing a tire shaping device having a first ring, a second ring, and a bladder extending between the first ring and the second ring; positioning a green tire carcass over said bladder, mounting a first bead of the green tire carcass onto the first ring, and a second bead of the green tire carcass onto the second ring, injecting pressurized fluid from one of said rings between the carcass and the bladder to inflate the carcass, and then inflating the bladder to further shape the carcass.

2. The method of claim 1 wherein the fluid between the carcass and the bladder is removed prior to inflating the bladder.

* * * * *